United States Patent [19]

Te Velde

[11] 4,178,077

[45] Dec. 11, 1979

[54] ELECTROSTATICALLY CONTROLLED PICTURE DISPLAY DEVICE

[75] Inventor: Ties S. Te Velde, Eindhoven, Netherlands

[73] Assignee: U.S. Philips Corporation, New York, N.Y.

[21] Appl. No.: 715,429

[22] Filed: Aug. 18, 1976

[30] Foreign Application Priority Data

Aug. 27, 1975 [NL] Netherlands ........................ 7510103

[51] Int. Cl.[2] ............................................ G05D 25/00

[52] U.S. Cl. .................................... 350/285; 350/269; 340/763

[58] Field of Search ............... 350/266, 267, 269, 285; 340/324 R, 324 M, 336, 335, 366 R, 366 B, 378 R, 378.1, 763, 764, 783

[56] References Cited

U.S. PATENT DOCUMENTS 3,924,228 12/1975 Goodrich ........................ 340/324 R

*Primary Examiner*—F. L. Evans

*Attorney, Agent, or Firm*—Robert S. Smith

[57] ABSTRACT

A passive picture display device having a number of display elements for controlling the reflection or the transmission of light. Each display element has two parallel supporting plates of which at least one is transparent, a first electrode disposed on one of said supporting plates, a second electrode disposed on the other supporting plate facing the first electrode, a third electrode movably disposed between the first and second electrodes by electrostatic forces and an opaque liquid the color of which contrasts with the color of the side of the third electrode facing the transparent supporting plate filling the space between the two supporting plates.

4 Claims, 11 Drawing Figures

ELECTROSTATICALLY CONTROLLED PICTURE DISPLAY DEVICE

Figure 1:
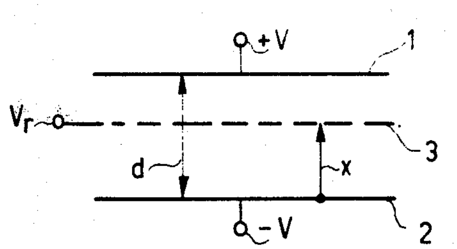

The invention relates to a passive picture display device of the kind comprising a number of display elements for controlling the reflection or the transmission of light, each display element comprising a first electrode, a second electrode and a third electrode, the third electrode being movable between the first and the second electrode by electrostatic forces.

A passive picture display device is to be understood to mean a picture display device of which the display elements themselves do not generate light but reflect or pass the ambient light in such manner that a picture is displayed. A passive picture display device may comprise, for example, a liquid crystal whose light reflection or light transmission is varied locally by applying voltages to given electrodes. It may alternatively comprise a material the color of which can be varied by means of an electric field, that is to say an electrochromic picture display device.

A picture display device of the electrostatic kind mentioned in the first paragraph is disclosed in U.S. Pat. No. 3,648,281. The device described in this specification comprises a number of display elements each having a movable electrode which in the neutral position bisects the angle between two other electrodes. The neutral position is obtained by means of a magnetic field. Technologically the construction of the known picture display device is difficult to and is such that voltages of hundreds of volts are necessary for control. Such high voltages are incompatible with the usual electronic circuits based on semiconductors. In addition, the construction of this known picture display device is such that only the reflection but not the transmission of light per picture element can be controlled.

It is an object of the invention to provide an electrostatically controlled picture display device of a technologically simple structure.

A further object of the invention is to provide an electrostatically controlled picture display device which can be controlled with low voltages to be generated by means of semiconductor circuits.

Still a further object of the invention is to provide such a picture display device which in principle is suitable for operation either in the reflection mode or in the transmission mode.

Another object of the invention is to provide such a picture display device in which the picture elements can assume two fixed positions.

These and other objects of the invention are achieved in that a picture display device of the kind referred to, according to the invention, comprises two parallel supporting plates of which at least one is transparent, that the first and the second electrode of each display element are provided on the facing surfaces of the supporting plates, and that the third electrode of each display element is movably disposed between the two supporting plates.

When the picture display device operates in the reflection mode, according to another object of the invention it may comprise an opaque liquid the color of which contrasts with the color of the side of the third electrodes observable in the excited state.

When the picture display device operates in the reflection mode, the electrodes on the transparent supporting plate are transparent, the third electrodes may be provided with a pattern of light transmitting areas and the electrodes on the other supporting plate may be provided with a pattern of differently colored areas which are in registration with the light transmitting areas in the third electrodes.

When the picture display device is constructed as a so-called cross-bar display, according to a further aspect of the invention all the third electrodes of a matrix of display elements are connected together.

According to still another embodiment of the invention the picture display device operates in the transmission mode and each display element constitutes a controllable light shutter. The construction is, for example, such that the third electrodes are provided with a pattern of light-transmitting areas and the electrodes on one of the supporting plates are provided with a pattern of light-transmitting areas which is the negative of the pattern in the third electrodes, thus providing a light shutter which passes no light when both electrodes are located substantially in one plane.

The invention also provides a method of manufacturing an electrode which is secured to a supporting plate so as to be movable by means of flexible strip-like parts is furthermore characterized by (a) the provision of a first layer of a material which can be etched by means of a first etchant;

(b) the provision of a second layer of an electrode material which can be etched by means of a second etchant, (c) the provision by means of a photo-etching method and the second etchant of a plurality of apertures in the parts of the second layer which should not remain connected to the supporting plate.

(d) the removal of parts of the first layer by underetching using the apertures in the second layer, by means of the first etchant.

Figure 2:
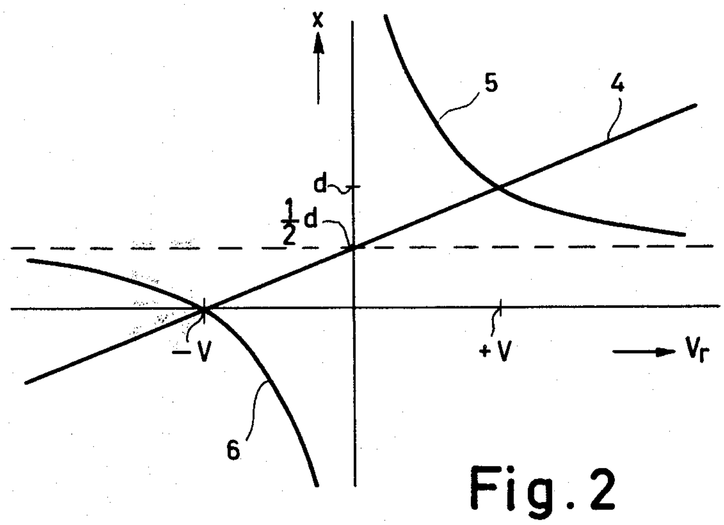
Figure 3:
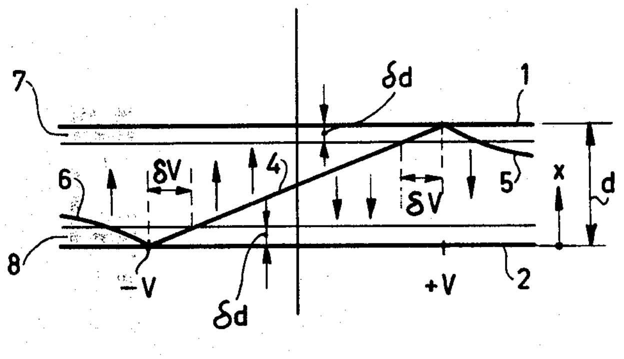
Figure 4:
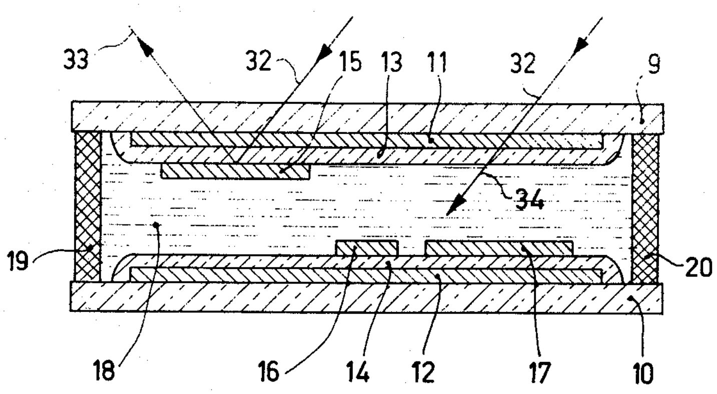
Figure 5:
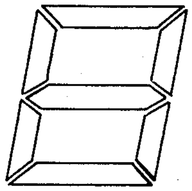
Figure 6:
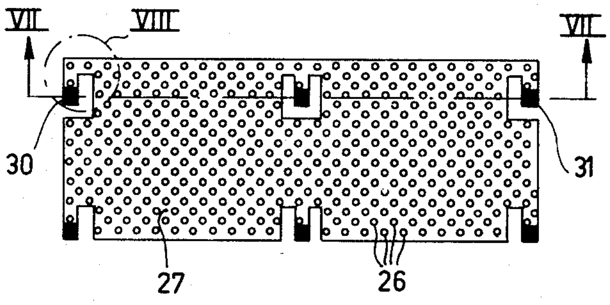
Figure 7:
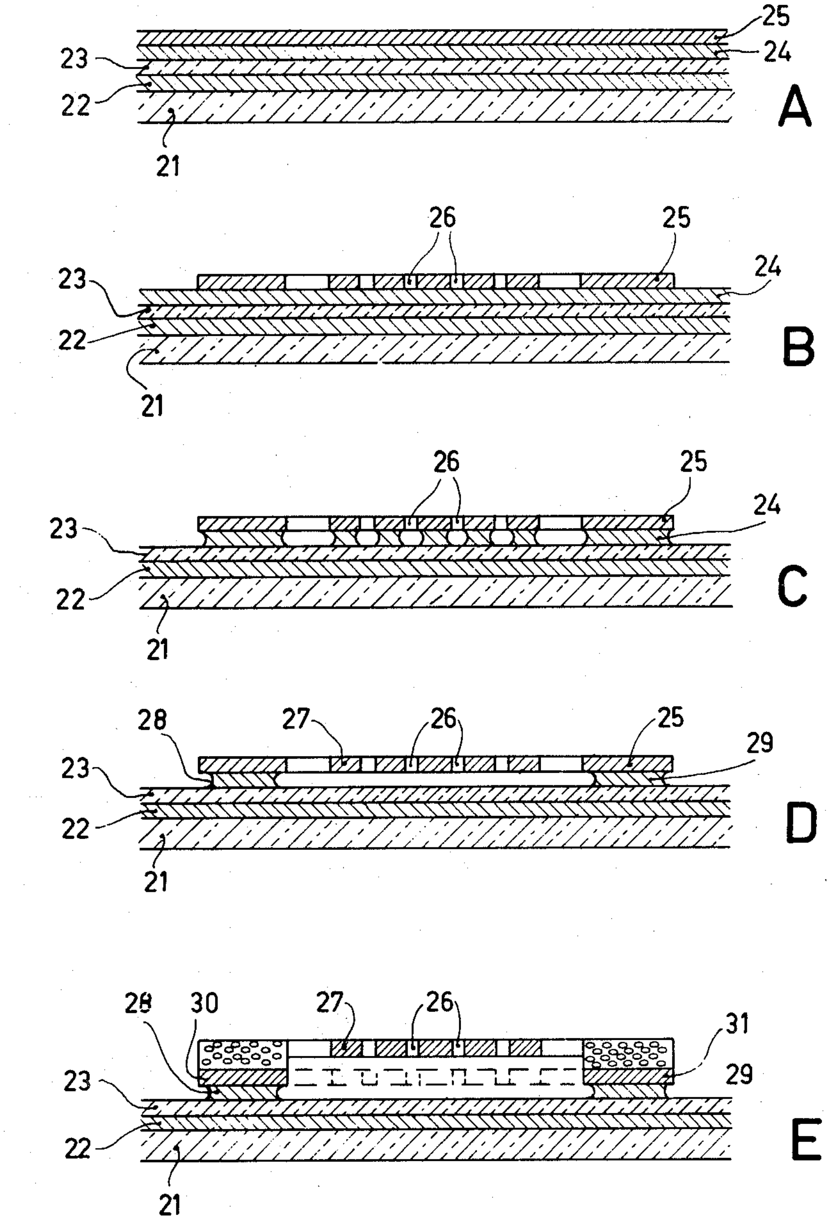
Figure 8:
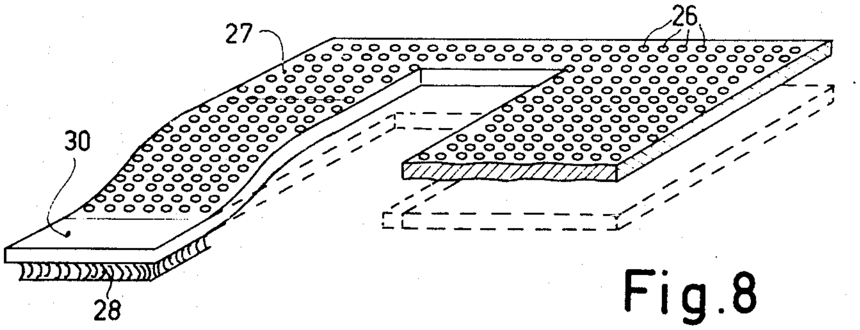
Figure 9:
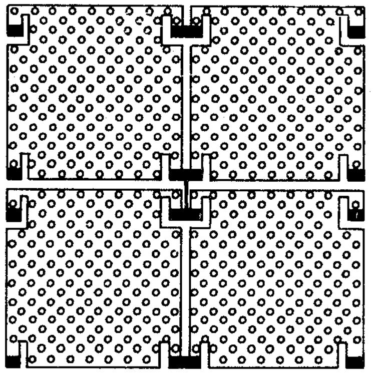

Embodiments of the invention will now be described by way of example with reference to the accompanying diagrammatic drawings, in which:

FIGS. 1, 2 and 3 explain the principle of operation of a picture display device embodying the invention, FIG. 4 shows a first embodiment which operates in the reflection mode, FIG. 5 shows an electrode pattern for this device, FIG. 6 shows an electrode of said device, FIG. 7 explains the manufacture of said electrode, FIG. 8 shows a point of connection of said electrode, FIG. 9 shows a part of a matrix of electrodes for a second embodiment.

Figure 10:
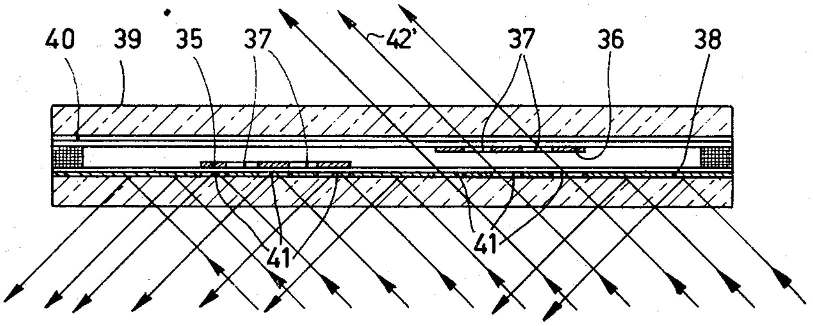
Figure 11:
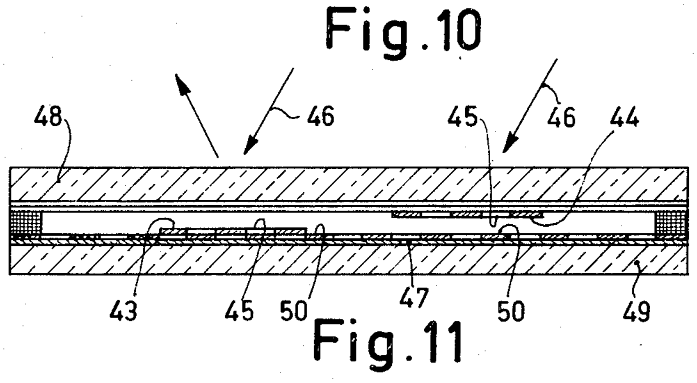

FIG. 10 shows a third embodiment which operates in the transmission mode, and FIG. 11 shows a fourth embodiment which operates in the reflection mode.

FIG. 1 shows diagrammatically two fixed parallel electrodes 1 and 2 spaced by a distance d and a movable electrode 3 spaced from the electrode 2 by a distance x. The voltages at the electrodes 1, 2 and 3 are +V, −V and $V_r$, respectively. The electrostatic forces which the electrodes 1 and 2 exert on the electrode 3 are determined by the square of the electric field strength between the electrodes. So the electrode 3 is only in equilibrium when $$(V-V_r/d-x)^2=(V_R+V/x)^2$$

This equilibrium is naturally unstable because for, when the electrode 3 is moved over a small distance from the equilibrium state, the force which is exerted between the electrodes which approach each other becomes larger and the force which is exerted between the electrodes which are drawing apart becomes smaller.

The above quadratic equation in $V_r$ and x has two solutions which are shown graphically in FIG. 2. The first solution is the straight line through the points ($V_r=-V$, $x=0$) and ($V_2=0$, $x=\frac{1}{2}d$). The second solution is the hyperbola with the branches 5 and 6 and the asymptotes $V_r=0$ and $x=\frac{1}{2}d$.

In practice the electrode 3 can move only in the area between the electrodes 1 and 2, as is shown in FIG. 3. As also shown in FIG. 3 the electrodes 1 and 2 are covered with insulating layers 7 and 8 having a thickness $\delta d$, as a result of which the third electrode 3 has as extreme positions $x=\delta d$ and $x=d-\delta d$. In principle, the insulating materials could also be present on both sides of the third electrode. In FIG. 3 the line 4 which denotes the range of possible equilibrium positions of electrode 3 intersects the line $x=\delta d$ with a voltage $V_r=-V+\delta V$ and the line $x=d-\delta d$ with a voltage $V_r=+V-\delta V$. It appears from FIG. 3 that in the range of voltages $V_r$ between $-V+\delta V$ and $+V-\delta V$ the third electrode has two stable states, namely $x=\delta d$ and $x=d-\delta d$. In a region approximately the size of $2\delta V$ in the proximity of $V_r=-V$ the third electrode is always driven upwards towards the fixed electrode 1. In a region approximately the size of $2\delta V$ in the proximity of $V_r-+V$ the third electrode is always driven downwards towards the fixed electrode 2. In other words: when the movable electrode assumes a stable position against one of the fixed electrodes (say electrode 1) and when in this condition the voltage $V_r=0$, then the voltage $V_r$ may increase to substantially $V-\delta V$ without the movable electrode 3 being moved towards the fixed electrode 2. This occurs only when the voltage increases to in the region approximately the size $2\delta V$ around $V_r=+V$. Thus, the device is bistable and has a very large threshold voltage, which latter property, as is known, is of great importance for a so-called crossbar display. A display element consisting of a movable electrode 3 and two fixed electrodes 1 and 2 is controlled by means of short lasting voltage pulses of an amplitude V or by means of pulses which represent a corresponding quantity of electric charge.

FIG. 4 shows a practical embodiment of a picture display device which is based on the principle explained with reference to FIGS. 1, 2 and 3. The device comprises two parallel glass supporting plates 9 and 10. Homogeneous electrode layers 11 and 12 are provided on the facing (opposed) surfaces of the supporting plates 9 and 10. At least the layer 11 should be transparent and therefore in this embodiment both layers 11 and 12 consist of 0.1 μm thick layers of indium oxide or tin oxide. 1 μm thick insulating quartz layers 13 and 14 cover the layers 11 and 12. The device comprises a number of movable electrodes which are 0.5 μm thick and are manufactured from nickel, three of which are visible in FIG. 4 and are identified by the numerals 15, 16 and 17. The device is furthermore filled with an opaque black liquid 18 consisting of a solution of sudan black in toluene and is sealed by sealing means 19 and 20. The electrodes 15, 16 and 17 can be controlled as was explained with reference to FIGS. 1, 2 and 3. The distance between the supporting plates 9 and 10, is 25 μm and the voltage V at the electrodes 11 and 12 is 10 Volts. The control is effected by means of voltage pulses having a duration of 20 ms and an amplitude of 10 volts at the electrodes 15, 16 and 17. In the stable condition the voltage at the electrodes 15, 16 and 17 is zero. By grouping the movable electrodes in the manner as is shown in FIG. 5, digits can be displayed in known manner. The ambient light (32) is reflected by the electrodes which are against the supporting plate 9 on the observer's side (33) and is absorbed elsewhere (34) or is reflected at least only in the color of the liquid 18.

The manufacture of the movable electrodes 15, 16 and 17 will be explained with reference to FIG. 7. FIG. 7A shows a glass supporting plate 21 on which a 0.1 μm thick electrode layer 22 of indium is vapor-deposited after which a 1 μm thick insulating layer 23 of quartz is vapor deposited. A 0.5 μm thick aluminium layer 24 and then a 0.5 μm thick nickel layer 25 are vapor-deposited on said layers. The shape of the electrode to be manufactured is etched in the layer 25 by means of a known photo-etching method. The etchant is nitric acid which does not attack the underlying layer of aluminium 24. During photoetching the part of the electrode which is to be movable is provided over the whole surface with a large number of apertures 26 having a diameter of 6 μm and a mutual spacing of 20 μm, as is shown in FIG. 7B. Etching is then carried out with potassium hydroxide which does not attack the nickel layer 25 but does attack the aluminium layer 24. The aluminium layer 24 is removed by so-called underetching via the apertures 26 in which, via the intermediate stage shown in FIG. 7C, the final condition shown in FIG. 7D is reached. The movable electrode 27 remains connected to the supporting plate by means of the parts 28 and 29 of the aluminium layer 24.

FIG. 6 is a plan view of the electrode 27 with the apertures 26. The areas 30 and 31 are not provided with apertures so that the underlying areas 28 and 29 of the aluminium layer are not etched away.

For further explanation, FIG. 8 in a perspective view of the part which is encircled in FIG. 6. In the broken-line position the electrode 27 is positioned against the supporting plate on which the electrode is secured.

FIG. 7E also shows the electrode 27 again in the position in which it is moved upwards.

FIG. 9 shows an embodiment of four of a large number of movable electrodes for a matrix display. In this embodiment the picture to be displayed is not constructed of segments which are grouped as is shown for example in FIG. 5, but of a large number of picture dots. Each picture dot is formed by a display element of a matrix of display elements. In such an embodiment the potential of all the movable electrodes is preferably kept the same so that, as shown in FIG. 9, they can be interconnected via their connection points. The fixed electrodes are formed in known manner by row electrodes and column electrodes which extend at right angles to each other. Such voltage pulses are supplied to a column electrode and a row electrode that only the display element at the intersection of a column electrode and a row electrode is moved from the stable quiescent state to the stable operating state. However, said voltage pulses must not be so large to cause movement of a display element to which only a voltage pulse is applied via a column electrode or only via a row electrode. The previously-described large threshold voltage of a device according to the invention is of great importance for that. All the display elements can be reset in the same condition by a voltage pulse simultaneously at all interconnected movable electrodes.

FIG. 10 shows a third embodiment of a picture display device embodying the invention. This embodiment operates in the transmission mode, that is to say with transmitted light. The control of this device is carried out entirely as already described with reference to FIG. 4. However, the device is not filled with liquid but with, for example, ordinary air at atmospheric pressure. However, a certain degree of a vacuum gives a slightly more rapid operation of the device. Two movable electrodes 35 and 36 are shown which are provided with a pattern of apertures in the manner already described. The apertures 37 are square with a side of 20 μm. They are arranged in rows with a mutual spacing of 40 μm. The longitudinal direction of the rows is at right angles to the plane of the drawing of FIG. 10. The pitch between the apertures in one row is slightly more than 20 μm so that a slot is formed which is interrupted by webs. A negative pattern 41 of this pattern of apertures is provided in the fixed electrode 38. When a movable electrode, for example electrode 35, is pressed against the fixed electrode 38, no light is transmitted to the observer's side 39 of the device. When a movable electrode, for example electrode 36, is pressed against the entirely transparent fixed electrode 40, light 42 is transmitted indeed, as is shown in FIG. 10. By operating with a strong external light source, pictures can also be projected in this manner. Alternatively, the movable electrodes may be secured in a resilient manner. In this manner, by causing the resilience to make equilibrium with the electrostatic force, each display element can assume one of several position so that a so-called gray scale is obtained (several gradations per display element).

FIG. 11 finally shows a fourth embodiment, which operates in the reflection mode. The device is filled with air but the movable electrodes 43 and 44 have a light-pervious pattern of apertures 45 so that p% of the incident light 46 is transmitted. The remainder (100-p)% of the incident light is absorbed. The fixed electrode 47 on the supporting plate 49 remote from the observer's side 48 comprises white, diffusely reflecting areas 50 which are in registration with the apertures 45 in the electrodes 43 and 44. So the electrode 44 reflects p% of the incident light and absorbs the remainder, namely (100-p)%. The quantity of light which is reflected by a display element, dependent on the position of the movable electrode (43, 44), is calculated as follows.

Electrode 44 transmits p% of which p% is reflected by the electrode 47 and of which subsequently again p% is transmitted by the electrode 44. The display element with the electrode 44 thus reflects a part $(p/100)^3$ of the incident ambient light.

All the light which passes through the apertures 45 of the electrode 43 is reflected diffusely by the regions 50 which are visible via the apertures 45. Thus, the display element with the electrode 40 reflects a part p/100 of the incident ambient light.

The contrast between the two display elements, that is to say the ratio between the reflected quantities of light, thus is $(p/100)^2$. In practice, p is for example 33% so that a contrast of 1:9 is attained.

What is claimed is:

1. A passive picture display device which comprises: a plurality of display elements for controlling the reflection or the transmission of light, each display element comprising a first electrode, a second electrode and a third electrode, said third electrode being movable between said first and the second electrodes by electrostatic force, said device further including first and second supporting plates disposed in parallel spaced relationship with at least portions of said first and second supporting plates facing each other, said first supporting plate being transparent, said first and said second electrode of each display element being disposed respectively on facing surfaces of said first and second supporting plates, and said third electrode of each display element being movably disposed between said first and second supporting plates, said first electrode on the said first supporting plate being transparent and the space between said supporting plates being filled with an opaque liquid the color of which contrasts with the color of the side of said third electrodes facing said first supporting plate, said third electrode being provided with a pattern of light transmitting areas and the electrode on one of said supporting plates comprising a pattern of differently colored areas which are disposed in registered relationship with said light transmitting areas of said third electrodes.

2. A passive picture display device which comprises: a plurality of display elements for controlling the reflection or the transmission of light, each display element comprising a first electrode, a second electrode and a third electrode, said third electrode being movable between said first and the second electrode by electrostatic forces, said device further including first and second supporting plates disposed in parallel spaced relationship with at least portions of said first and second supporting plates facing each other, said first supporting plate being transparent, said first and said second electrode of each display element being disposed respectively on opposed surfaces of said first and second supporting plates, and said third electrode of each display element being movably disposed between said two supporting plates, said first electrode on said first supporting plate being transparent and the space between said supporting plates being filled with an opaque liquid the color of which contrasts with the color of the side of said third electrode facing said first supporting plate, one of said supporting plates comprising a plurality of strip-shaped electrodes which forms a system of rows of first electrodes, the other of said supporting plates comprising a plurality of strip-shaped electrodes which forms a system of columns of second electrodes, a matrix of display elements being formed by the rows and columns crossing each other, all the third electrodes in a plurality of said display elements being interconnected.

3. A passive picture display device which comprises: a plurality of display elements for controlling the reflection or the transmission of light, each display element comprising a first electrode, a second electrode and a third electrode, said third electrode being movable between said first and the second electrodes by electrostatic forces, said device further including first and second supporting plates disposed in parallel spaced relationship, said first supporting plate being transparent, said first and said second electrodes of each display element being disposed respectively on opposed surfaces of said first and second supporting plates, and said third electrode of each display element being movably disposed between said two supporting plates, said first electrode on said first supporting plate being transparent and the space between said supporting plates is filled with an opaque liquid the color of which contrasts with the color of the side of said third electrodes facing said first supporting plate, said second supporting plate also being transparent and each display element forming a controllable light shutter.

4. A picture display device as claimed in claim 3, characterized in that each of said third electrodes is provided with a pattern of light-transmitting areas and said electrodes disposed on one of said supporting plates is provided with a pattern of light transmitting areas which is the negative of the pattern in each of said third electrodes, each of said light shutters transmitting no light when both electrodes are located substantially in one plane.

* * * * *